(No Model.)
J. GREENWOOD.
BAND PULLEY.
No. 246,758. Patented Sept. 6, 1881.
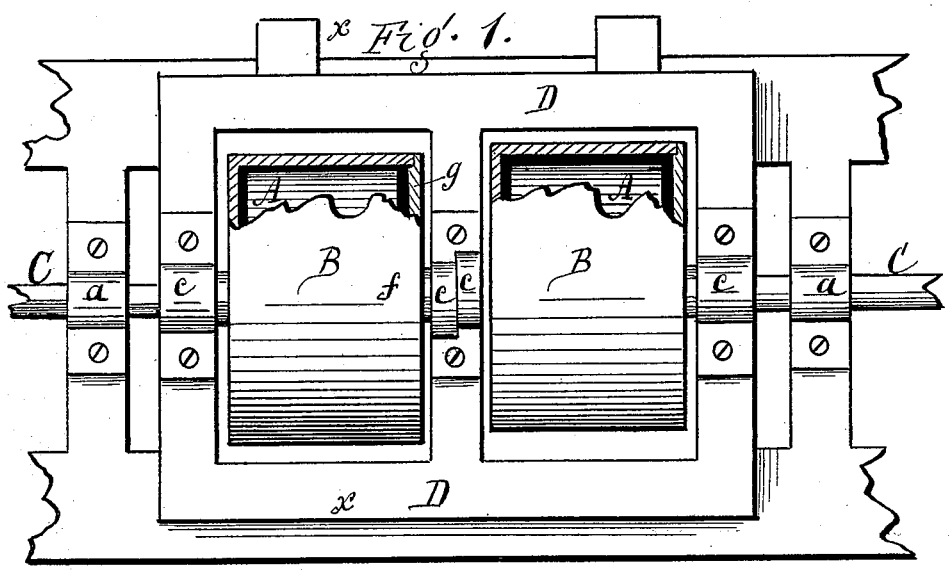
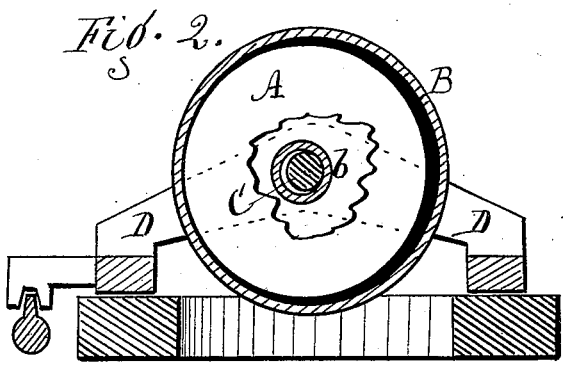
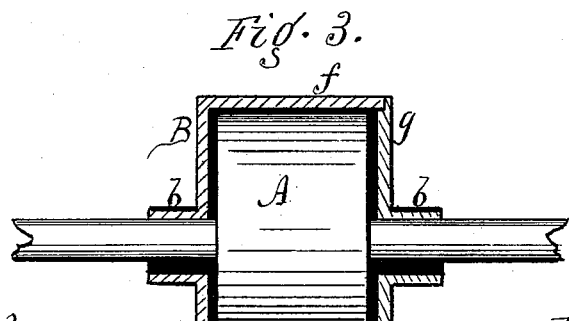
Attest.
Chas. F. Queen
G. H. Jones
Inventor.
John Greenwood
pr R. T. Osgood
atty.

UNITED STATES PATENT OFFICE.

JOHN GREENWOOD, OF ROCHESTER, NEW YORK.

BAND-PULLEY.

SPECIFICATION forming part of Letters Patent No. 246,758, dated September 6, 1881.

Application filed May 20, 1881. (No model.)

*To all whom it may concern:*

Be it known that I, JOHN GREENWOOD, of Rochester, Monroe county, New York, have invented a certain new and useful Improvement in Band-Pulleys; and I do hereby declare that the following is a full, clear, and exact description of the same, reference being had to the accompanying drawings, in which—

Figure 1 is a plan of my improvement. Fig. 2 is a cross-section in line $xx$. Fig. 3 is a horizontal section through the axis of the outer pulley, showing the inner pulley in plan.

My improvement relates to fast and loose pulleys, or those which are so arranged that the band can be thrown into and out of motion at pleasure.

The invention consists in the combination of two pulleys, one situated within the other, the inner one being attached to a shaft resting in fixed bearings, the outer one having journals resting in movable bearings, whereby said outer pulley may be moved laterally to bring it into and out of contact with the periphery of the inner pulley, as hereinafter more fully described.

In the drawings, A represents the inner pulley and B the outer one. The inner pulley is attached to and revolves with a shaft, C, which rests in fixed bearings or boxes $a\ a$. The outer pulley has hollow journals $b\ b$, which rest around the shaft C and in bearings or boxes $c\ c$, attached to a laterally-movable carriage, D, or some other device by which the pulley can be thrown laterally to a small extent. The interior of the journals $b\ b$ is a little greater than the diameter of the shaft C, to allow this lateral throw to be made. The outer pulley consists of a hollow body, $f$, and a removable head, $g$, at one end, by which means it is readily inserted over the inner pulley.

The band extends around the outer pulley and to the pulley which forms the driver. By throwing the outer pulley in one direction, so that the two pulleys come in contact, as shown in Figs. 2 and 3, revolving motion will be imparted to the inner pulley and motion will be given to the shaft C. By moving the outer pulley slightly in the opposite direction the two pulleys are thrown out of engagement or contact with each other, and the inner one remains still while the outer one still revolves.

The inner pulley is made as large as is consistent with proper operation of the parts, in order that when the pulleys are brought into engagement the contact-surface shall be as large as possible. The interior surface of the outer pulley or the outer surface of the inner pulley is covered with leather or other suitable material to insure friction.

The advantages of this invention are that it is simple, cheap, in compact form, and the necessity of running the belt off sidewise is avoided, thereby saving much wear and strain on the belt and obviating labor. Much space is also saved, and the device is adapted to many places where two side pulleys could not be placed.

Instead of making the outer pulley movable and the inner one relatively stationary, the action may be reversed, and the outer pulley be made stationary, and the inner one with its shaft be movable, to produce the frictional engagement.

In Fig. 1 two sets of pulleys are shown standing side by side and arranged in the same carriage D. This is for producing a reverse motion. In such case the two pulleys of each pair engage in opposite directions or on opposite sides, and a band leads from each pair of pulleys to the driving-pulley. It is frequently necessary to give reverse motions in a machine in feeding forward and back, and for various purposes, and by the use of these double pulleys this can be readily done.

Having thus described my invention, what I claim as new is—

1. The combination of the two pulleys A B, situated one within the other, the inner pulley being attached to a shaft running in fixed bearings, the outer pulley being provided with hollow journals fitting loosely around the shaft and resting in movable bearings, the whole so arranged, as described, that by moving the outer pulley in one direction or the other it is thrown into and out of engagement with the inner pulley, as herein shown and described.

2. The combination of two sets of pulleys located side by side, each set consisting of two pulleys, A B, located one inside the other, and arranged as described, so as to impart motion to two bands on the outside pulleys by the engagement of the inner with the outer pulleys in opposite directions, as herein shown and described.

In witness whereof I have hereunto signed my name in the presence of two subscribing witnesses.

JOHN GREENWOOD.

Witnesses:
R. F. OSGOOD,
CHAUNCEY PERRY.